United States Patent Office 3,106,567
Patented Oct. 8, 1963

3,106,567
METHOD OF MAKING 2,2'-BIPHENYL LACTONE
John O. Hawthorne, Pittsburgh, and Edward L. Mihelic, Sr., Penn Hills Township, Allegheny County, Pa., assignors to United States Steel Corporation, a corporation of New Jersey
No Drawing. Filed Apr. 5, 1961, Ser. No. 100,809
4 Claims. (Cl. 260—343.2)

This invention relates to a method of making the lactone of 2,2'-diphenic acid, i.e., 2,2'-biphenyl lactone. This compound is useful as a rodent repellent and as a stabilizer of resins against the discoloring effect of ultraviolet light.

This is a continuation-in-part of our application Serial No. 20,814, filed April 8, 1960, now abandoned.

Numerous methods are known for making 2,2'-biphenyl lactone but they are all characterized by a low yield or the use of expensive starting material or reagents.

We have discovered that 2,2'-diphenic acid in neutral aqueous solution may be oxidized by hydrogen peroxide to give the lactone of the acid in good yield. Since 2,2'-diphenic acid may be produced from low-cost phenanthrene, the invention provides an economical source of the lactone and a simple process for its preparation.

A complete understanding of the invention may be obtained from the following detailed explanation of typical examples of the practice thereof.

Example 1

In a 100-ml. flask fitted with a reflux condenser, 2.4 grams (0.01 mole) 2,2'-diphenic acid, 1.0 grams (0.01 mole) trimethylamine, 0.14 gram (0.0025 mole) potassium hydroxide, and 50 ml. water were heated to boiling. Thirty percent hydrogen peroxide (2.0 ml.; 0.02 mole) was added, and the solution was refluxed for 72 hours. The product separated as an oil at this temperature. The solution was cooled to 0° C., and the solidified 2,2'-biphenyl lactone was collected by filtration. After washing with water and drying, the product, melting in the range 83 to 89° C., weighed 0.40 gram (20.0% yield, based on the amount of diphenic acid initially present in the reaction). The aqueous mother liquor was acidified to pH 1 with concentrated hydrochloric acid and the solution concentrated to a volume of 10 to 15 ml. After cooling to below room temperature, the precipitated diphenic acid, melting in the range 208 to 220° C. (pure, 230 to 232° C.), was collected and washed with water. This material weighed 1.2 grams, giving a 50.0 weight percent recovery of starting material. Based on the diphenic acid consumed, the yield of 2,2'-diphenyl lactone was 40%.

Example 2

In a 250-ml. flask fitted with a reflux condenser, 4.8 grams (0.02 mole) 2,2'-diphenic acid, 0.0926 gram (0.0025 equivalent) calcium hydroxide, and 100 ml. water were heated to boiling. Thirty percent hydrogen peroxide (4.0 ml.; 0.04 mole) was added, and the solution was refluxed for 72 hours. The product separated as an oil at this temperature. The solution was cooled to 0° C., and the solidified 2,2'-biphenyl lactone was collected by filtration. After washing with water and drying, the product, melting in the range 83 to 87° C., weighed 3.17 grams (81% yield, based on the amount of diphenic acid originally present in the reaction). The aqueous mother liquor was acidified to pH 1 with concentrated hydrochloric acid and the solution concentrated to a volume of 20 to 30 ml. After cooling to below room temperature, the precipitated diphenic acid was collected and washed with water. This material weighed 0.5 gram, giving a 10 weight percent recovery of starting material. Based on the diphenic acid consumed, the yield of crude 2,2'-biphenyl lactone was 90%.

The above-mentioned crude 2,2'-biphenyl lactone was purified by heating it to boiling with 10 ml. of an aqueous solution containing 7 weight percent of sodium bicarbonate, cooling the solution until the lactone solidified, and collecting the lactone. The purified lactone, melting in the range 88 to 93° C., weighed 2.92 grams. Based upon the amount of diphenic acid consumed, the yield of purified 2,2'-biphenyl lactone was 83%.

Example 3

In a 250-ml. flask, 4.8 grams (0.02 mole) 2,2'-diphenic acid, 0.0926 gram (0.0025 equivalent) sodium bicarbonate, and 100 ml. water were heated to boiling. Thirty percent hydrogen peroxide (2.0 ml.; 0.02 mole) was added, and the solution was refluxed for 72 hours. The products separated as an oil at this temperature. Since the oil contained a considerable amount of diphenic acid, 10 ml. of an aqueous solution containing 7 weight percent of sodium bicarbonate were added to it, and the mixture was heated to boiling. The mixture was then cooled until the lactone solidified, and the lactone was collected. The purified lactone, melting in the range 89 to 92° C., weighed 1.88 grams. Acidification of the aqueous mother liquor from the purification process to pH 1 with hydrochloric acid precipitated 1.97 grams of diphenic acid, giving a 41 weight percent recovery of starting material. Based on the amount of diphenic acid consumed, the yield of 2,2'-biphenyl lactone was 82%.

Example 4

In a 250-ml. flask fitted with a reflux condenser, 4.8 grams (0.02 mole) 2,2'-diphenic acid, 0.20 gram (0.0050 equivalent) sodium hydroxide, and 100 ml. water was heated to boiling. Thirty percent hydrogen peroxide (4.0 ml.; 0.04 mole) was added, and the solution was refluxed for 72 hours. Crude, solidified 2,2'-biphenyl lactone, melting in the range 82 to 90° C. was recovered as described above in Example 2. The crude lactone weighed 2.80 grams (89% yield, based on the diphenic acid consumed). The aqueous mother liquor was treated as described in Example 2; this precipitated 0.95 gram of diphenic acid, giving a 20 weight percent recovery of starting material.

The above mentioned crude 2,2'-biphenyl lactone was purified as described in Example 2. The purified 2,2'-biphenyl lactone melted in the range 91 to 92° C. and weighed 2.44 grams. Based on the amount of diphenic acid consumed, the yield of purified lactone was 78%.

Example 5

In a 250-ml. flask fitted with a reflux condenser, 4.8 grams (0.02 mole) 2,2'-diphenic acid, 0.420 gm. (0.0052 equivalent) sodium bicarbonate, and 100 ml. water were heated to boiling. Thirty percent hydrogen peroxide (4.0 ml.; 0.04 mole) was added, and the solution was refluxed for 48 hours. The product separated as an oil, from which crude 2,2'-biphenyl lactone was obtained as described in Example 2. The crude lactone, melting in the range 83 to 89° C., weighed 2.51 grams. Diphenic acid (1.17 grams, 24 weight percent recovery of the starting material) was recovered by acidification of the aqueous mother liquor as taught in Example 2. Hence, the yield of crude 2,2'-biphenyl lactone, based upon the diphenic acid consumed, was 85%.

Upon purification of the crude lactone as described in Example 2, we recovered 2.28 grams (77% yield, based upon diphenic acid consumed) of 2,2'-biphenyl lactone melting in the range 91 to 92° C.

Example 6

Example 5 was repeated, except that 0.1656 gm. (0.0024 equivalent) of potassium carbonate was substituted for the sodium bicarbonate, and the reflux time was 72 hours. The recovery of crude lactone, melting in the range 82 to 89° C., was 3.22 grams. The diphenic acid recovered weighed 0.54 gram, an 11 weight percent recovery of starting material. The yield of crude lactone, based upon diphenic acid consumed, was 92%. Upon purification as described in Example 2, 2.88 grams (83% yield) of 2,2'-biphenyl lactone melting in the range 90 to 92° C. were recovered.

Example 7

Example 6 was repeated, except that 0.0463 gm. (0.00125 equivalent) of calcium hydroxide was substituted for the potassium carbonate. The recovery of crude lactone, melting in the range 80 to 86° C., was 3.45 grams. The diphenic acid recovered weighed 0.25 gram, a 5 weight percent recovery of starting material. The yield of crude lactone, based upon diphenic acid consumed, was 93%. Upon purification, as described in Example 2, 3.23 grams (87% yield) of 2,2'-biphenyl lactone melting in the range 88 to 92° C. were recovered.

Example 8

Example 7 was repeated, except that only 0.0185 gm. (0.0005 equivalent) of calcium hydroxide were used. The recovery of crude lactone, melting at 84 to 89° C., was 3.47 grams. The diphenic acid recovered weighed 0.13 gram, a 2.7 weight percent recovery of starting material. The yield of crude lactone, based upon diphenic acid consumed, was 91%. Upon purification, as described in Example 2, 3.32 grams (87% yield) of 2,2'-biphenyl lactone melting in the range 89 to 93° C. were recovered.

Example 9

Example 8 was repeated, except that no alkali or alkaline-earth oxide, hydroxide, carbonate or bicarbonate was used. The recovery of crude lactone, melting at 85 to 105° C., was 3.67 grams. The diphenic acid recovered weighed 0.10 gram, a 2.1 weight percent recovery of starting material. The yield of crude lactone, based upon diphenic acid consumed, was 95%. Upon purification, as described in Example 2, 3.28 grams (85% yield) of 2,2'-biphenyl lactone melting in the range 90 to 93° C. were recovered.

The practices described may be varied within limits. The amount of alkali or alkaline salt may be from zero to one equivalent per mole or diphenic acid, preferably 0.025 equivalent and the hydrogen peroxide from 1 to 3 moles per mole of diphenic acid. Instead of filtration, extraction of the reaction mixture with an organic solvent immiscible with water (e.g., benzene, ether or chloroform) may be used as a method for collecting the product lactone. The refluxing time may be from 48 to 72 hours.

The utility of the lactone as a color stabilizer against light is explained in Hawthorne et al. Patent No. 2,905,570.

The lactone may be applied or compounded by a variety of methods to or with any material which is subject to attack by rodents, so that damage from these pests is decreased or prevented. Packaging material, such as wooden or paper boxes and paper, fiber, or plastic bags, growing crops, building materials, synthetic or natural fibrous materials, dyes, paints, lacquers, waxes and plastics are included in articles that may be treated.

Application may be as a dust composed of 10% of the compound and 90% of an inert material (e.g., clay) or as a liquid composed of a 10% solution in an organic solvent (e.g., acetone, alcohol, aromatic hydrocarbon, etc.) which is spread by spraying, brushing or rolling. The compound may be dispersed in water with a surface-active agent or melted at the temperature of boiling water for application. The compound may be added to materials by the use of an aqueous solution of the ammonium salt of 2-hydroxy-2'-biphenylcarboxylic acid. Heating the impregnated material at 125° C. drives off water and ammonia to leave the lactone in the product. A material may be impregnated with an aqueous solution of the sodium salt of 2-hydroxy-2'-biphenylcarboxylic acid, from which acidification will precipitate the lactone within the material. This compound may be incorporated in manufactured materials, such as paper, during their formation by, for example, adding it to the pulp during processing.

In surface coating, the limits of the amount of the active compound to be applied are 0.1 to 100 pounds per 1000 square feet of the surface to be protected; the most likely commercial range is between 1 and 20 pounds, and the preferred range between 5 and 15 pounds. Expressed in terms of weight percent of the final product, the limits of the amount of the compound contained in the material are between 0.05 and 20.0 weight percent; the most likely commercial range is between 0.25 and 10 weight percent, and the preferred range between 0.5 and 5 weight percent.

The rodent repellency of the lactone is shown by the following tests. Rats were permitted to feed for four days on 20 grams of bait containing 2.0 weight percent of the compound and on an equal amount of untreated bait. Having eaten the untreated bait in little more than a day, the rats ate nothing during the remainder of the test period rather than touch the treated food. The compound was then tested at 0.5 weight percent concentration in bait and found to have essentially the same activity as at the 2.0 weight percent level.

The lactone dissolved in acetone was applied to burlap bags at a concentration of 5.0 mg./sq. in. and tested with individually caged house mice against untreated control bags. There was a 52% reduction in damage of the treated bags compared to the untreated.

While we have shown and described certain preferred practices of the invention, it is apparent that other modifications may arise. Therefore, we do not wish to be limited to the disclosure set forth but only by the scope of the appended claims.

We claim:

1. A method of making 2,2'-biphenyl lactone comprising forming an aqueous solution of 2,2'-diphenic acid, adding hydrogen peroxide to the solution and heating it, thereby causing the lactone to appear as an oil, and collecting the lactone thus formed.

2. A method as defined in claim 1, characterized by adding to said solution a base in an amount up to one molar equivalent of the acid.

3. A method of making 2,2'-biphenyl lactone comprising forming an aqueous solution of 2,2'-diphenic acid and sufficient of a base to neutralize it, adding hydrogen peroxide to the solution and heating it, thereby causing the lactone to appear as an oil, and collecting the lactone thus formed.

4. A method as defined in claim 3, characterized by adding to said solution from 1 to 2.5 moles of a tertiary amine selected from the group consisting of pyridine and trimethyl amine per mole of the acid.

No references cited.